J. W. LEDOUX.
PROPORTIONAL METER.
APPLICATION FILED APR. 16, 1915.
1,225,978.
Patented May 15, 1917.
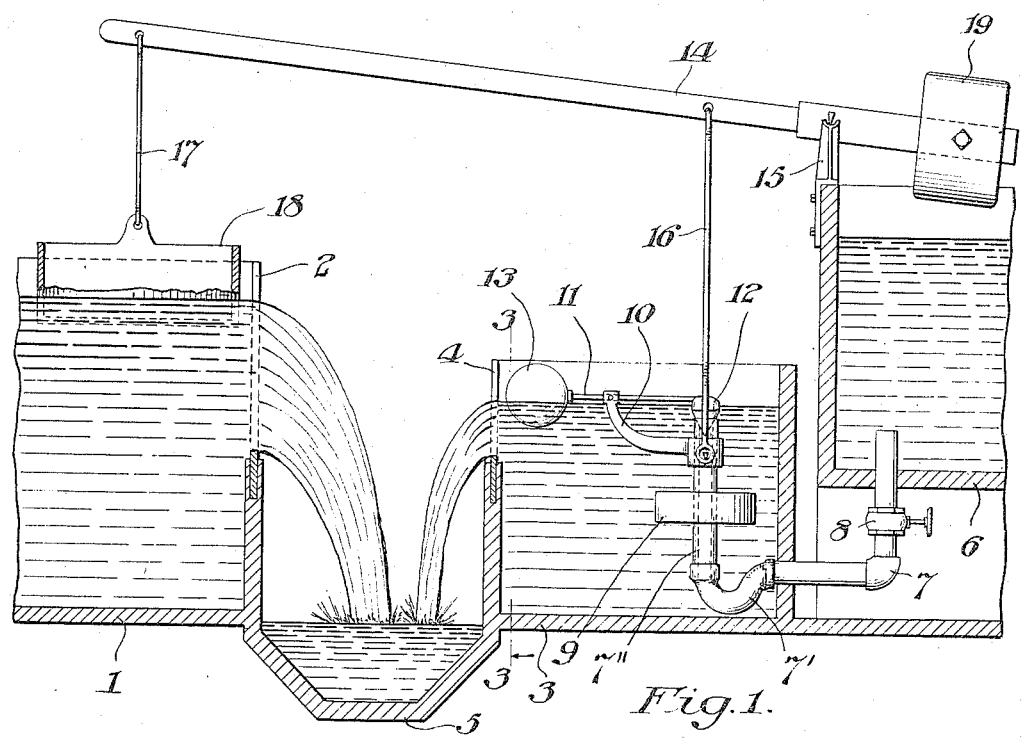
Fig. 1.
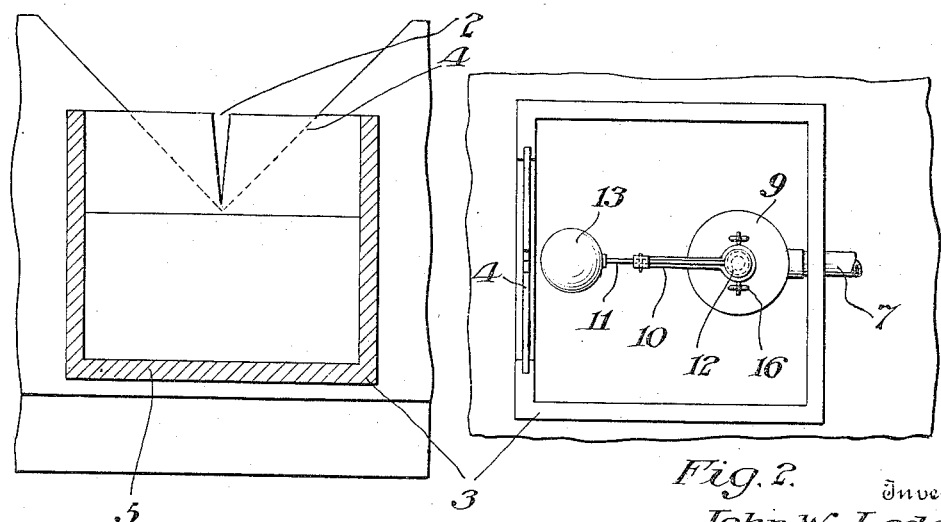
Fig. 3.
Fig. 2.
Inventor,
John W. Ledoux
By Charles N. Butler
Attorney

UNITED STATES PATENT OFFICE.

JOHN W. LEDOUX, OF SWARTHMORE, PENNSYLVANIA.

PROPORTIONAL METER.

1,225,978. Specification of Letters Patent. Patented May 15, 1917.

Application filed April 16, 1915. Serial No. 21,626.

*To all whom it may concern:*

Be it known that I, JOHN W. LEDOUX, a citizen of the United States, residing at Swarthmore, Delaware county, Pennsylvania, have invented certain Improvements in Proportional Meters, of which the following is a specification.

This invention relates to means for effecting proportionate flows of fluids, and it is adapted for determining a main flow by a smaller flow proportionate thereto, for delivering a measured proportionate amount of a coagulant to water, for feeding a measured proportionate amount of hydro-chlorite to sewage, and generally for delivering a small quantity of fluid proportionate to a larger quantity throughout variations in the rate of flow.

The characteristic features of my invention are disclosed in the following description and the accompanying drawings in illustration thereof.

In the drawings, Figure 1 is a sectional elevation of apparatus embodying my invention; Fig. 2 is a top plan view of the float chamber with correlated means for measuring liquid to be delivered in a definite proportion to another liquid, and Fig. 3 is a sectional elevation on the line 3—3 of Fig. 1.

The apparatus, as illustrated in the drawings, comprises the chamber or conduit 1, containing the V-notch 2 and the chamber or conduit 3 containing the V-notch 4, with a channel 5 between them, to which fluids from the conduits 1 and 3 are delivered through the respective notches 2 and 4.

A tank 6 is connected by the conduit 7, containing the valve 8, with the interior of the chamber 3, the conduit 7 having within the chamber a flexible section 7′ and a vertical section 7″.

The conduit section 7″ has an equilibrating weight 9 and an arm 10 fixed thereon. The arm provides a fulcrum for a lever 11, having at one end a puppet valve 12 for controlling the discharge from the section 7″ and at the other end a float 13 movable with the level of the fluid in the chamber 3 to operate the valve 12.

A lever 14, having the fulcrum 15 on the tank 6, is connected by the link 16 with the section 7″ and by the link 17 with a float 18 which is movable in the conduit 1 with the rise and fall of fluid therein, the lever being provided with a counterpoise 19 adjustable to effect the desired balance.

In operation, fluid flows from the chamber 6 through the conduit 7 to the chamber 3, under control of the valve 12, the valve 8 being open during the operation. The lever 14 acts through the link 16 to hold the section 7″ at the desired level and the position of the lever 14 is determined by the float 18, which rises and falls with the fluid in the channel 1. When the fluid in the channel 1 is at the level of the bottom of the notch 2, the fluid in the channel 3 is at the level of the bottom of the notch 4, the section 7″ being in its lowest position and the valve 12 being closed by the action of the float 13 through the lever 11. When the level of the fluid in the channel 1 rises above the bottom of the notch 2, the consequent elevation of the float 18 permits the poise 19, acting through the lever 14 and link 18, to elevate the section 7″. As this effects the opening of the valve 12 due to the float 13 remaining in its lower position, fluid now flows from the chamber 6 through the conduit 7 to the chamber 3.

It will be understood that the discharge from the section 7″ will be regulated so that the depth of the fluid in the notch 4 will be proportional to the depth of the fluid in the notch 2, for any tendency of the fluid to fall in the notch 4 below the requisite level is accompanied by a corresponding downward movement of the float 13 and a corresponding upward movement of the valve 12 with resulting increased discharge from the section 7″, while any rise of the fluid level in the notch 4 above that required for the desired proportion elevates the float 13 and closes the valve 12.

The depth of the liquid in the notch 4 is a known function of the rate of flow therethrough and of the proportionate rate through the notch 2.

While notches have been shown and described, the invention comprehends the use of any similar passages or orifices, through which the flow depends upon the same exponential function of the head.

It will be understood that the mechanism is adapted for coöperation with usual types of registers or recorders for indicating the flow.

Having described my invention, I claim:

1. In a proportionate meter, a plurality of fluid conduits having discharge apertures of constant character, and means for providing heads in one of said apertures proportionate to the heads in the other, said means comprising a duct having a movable outlet, valve mechanism for controlling said outlet, and mechanism for moving said duct to control the position of said outlet.

2. In a proportionate meter, the combination of a plurality of fluid conduits having respective weirs of constant character and means, comprising a float movable with variations of the level of fluid in one of said weirs and a float movable with variations of the level of fluid in the other of said weirs, whereby the heads in one of said weirs are maintained in substantially constant relation to the heads in the other of said weirs.

3. In a proportionate meter, a plurality of open fluid passages having discharge notches of constant character, a float movable by fluid flowing in one of said passages, a lever movable by said float, a duct having a movable outlet discharging into the other of said passages, means whereby said lever regulates the elevation of said outlet, and valve mechanism for controlling said outlet.

4. In a proportional meter, a weir of constant character, a movable duct having an outlet, and means whereby said duct is moved to vary the elevation of its outlet with variations in the head of fluid flowing through said weir.

5. In a proportional meter, a conduit having a movable outlet, a lever, means whereby said lever regulates the elevation of said outlet, a weir of constant character, and means movable with fluid in said weir whereby the position of said lever is varied with changes in the level of fluid in said weir.

6. In a proportionate meter, a conduit having a movable outlet, valve mechanism for controlling said outlet, a fluid passage, and means whereby the fluid flowing through said passage adjusts the elevation of said outlet.

7. In a proportional meter, a conduit having a movable outlet, a valve for controlling said outlet, a float for controlling said valve, a receptacle into which said outlet is adapted to discharge a liquid whereby the position of said float is determined, and means for regulating the elevation of said outlet.

8. In a proportional meter, a liquid container, a conduit having a movable outlet through which liquid in said container is adapted to be discharged, a container into which said outlet is adapted to discharge, a lever connected with said outlet, a weir, a float movable with the level of liquid in said weir, and means whereby said float effects the movement of said outlet.

9. In a proportional meter, a liquid container, a weir, a conduit having a movable outlet whereby liquid in said conduit is delivered to said weir, a valve for controlling said outlet, a float movable with the level of liquid in said weir for operating said valve, a second weir, and means comprising a float movable with the level of liquid in said second weir for regulating the elevation of said outlet.

In testimony whereof I have hereunto set my name this 14th day of April, 1915.

JOHN W. LEDOUX.